United States Patent [19]

Jensen et al.

[11] 4,181,015
[45] Jan. 1, 1980

[54] SHEET MATERIAL FLAW DETECTOR

[75] Inventors: James W. Jensen; Stanley J. Miller, both of Hastings, Mich.

[73] Assignee: Gulf & Western Manufacturing Company, Southfield, Mich.

[21] Appl. No.: 930,549

[22] Filed: Aug. 2, 1978

[51] Int. Cl.$^2$ .............................................. G01B 5/20
[52] U.S. Cl. .................................................... 73/159
[58] Field of Search .......................... 73/159; 340/675

[56] References Cited

U.S. PATENT DOCUMENTS

| | | | |
|---|---|---|---|
| 869,324 | 10/1907 | Obert | 73/159 |
| 1,963,310 | 6/1934 | Nichols | 33/159 R |
| 2,576,614 | 11/1951 | Lewellen | 73/159 |
| 2,896,196 | 7/1959 | Hartford | 340/678 |
| 3,363,458 | 1/1968 | Scharf | 73/159 |
| 3,553,668 | 1/1971 | Urmenyi | 340/678 |

FOREIGN PATENT DOCUMENTS 923295  4/1963  United Kingdom ...................... 73/159

*Primary Examiner*—S. Clement Swisher
*Attorney, Agent, or Firm*—Meyer, Tilberry & Body

[57] ABSTRACT

Apparatus is disclosed for detecting flaws in sheet material of the character which increase the surface height of the sheet material. The apparatus includes a pair of horizontally parallel driven lower rolls and three upper rolls each mounted on a corresponding pivotal bracket. Two of the upper rolls are associated with one of the lower rolls and are axially spaced apart therealong, and the third upper roll is associated with the other lower roll and positioned therealong to span the space between the other two upper rolls. Each of the upper rolls is rotatably supported by the corresponding bracket for pivotal movement toward and away from the lower roll. Each upper roll bracket is provided with a pair of adjustable stop screws, one adjacent each of the opposite ends of the corresponding upper roll, and each adjustable stop screw carries a switch actuator screw which is adjustable relative to the stop screw. The apparatus frame carries a pair of microswitches for each roll actuated by a corresponding one of the actuator screws through a pivotal switch lever. Each bracket and thus the corresponding upper roll is biased toward the corresponding lower roll, and the spacing between the upper and lower roll is adjusted by the pair of stop screws. An increase in surface height of a sheet passing between the rolls causes the upper roll to be deflected upwardly to actuate one or the other or both of the microswitches.

22 Claims, 9 Drawing Figures

SHEET MATERIAL FLAW DETECTOR

BACKGROUND OF THE INVENTION

This invention relates to the art of flaw detectors for moving sheet material and, more particularly, to apparatus for mechanically detecting an increase in surface height of a moving sheet of material.

In the art of producing thin walled seamless metallic can bodies of steel or aluminum, a shallow cup-shaped blank is first produced from a flat metal sheet and is thereafter deep drawn to produce an elongated can body blank. In order to be economically competitive with other container constructions in the market place, seamless can body production must be achieved at high output rates. In order to avoid excessive equipment requirements and/or size, the production machinery must therefore operate at high speeds. Furthermore, in order to avoid machinery jams and/or the production of defective or unacceptable can bodies while maintaining a desirable high speed operation and output, accuracy between mechanically cooperative parts is extremely important. Likewise, in connection with the foregoing operating parameters, it is important to preliminarily eliminate any initial flat metal sheet having a defect or flaw of the character which might cause such apparatus jams and/or the production of unacceptable can bodies. In this respect, it will be appreciated that the initial flat metal sheets from which the cup-shaped can body blanks are initially produced are either delivered in stacks from which the sheets are individually removed and transported to the cupping press, or are delivered in rolls from which appropriate lengths are cut for delivery to the cupping press. In either case, defects often occur in the flat sheet material during production, cutting and stacking, coiling, or transportation to a point of use. Such defects may, for example, include an increase in the sheet material thickness, or a lump, kink, bend, crease or inclusion in the sheet material. Any such defect in the sheet material can cause the undesired jamming of the apparatus and/or the production of unacceptable can blanks and, moreover, can be damaging to the press apparatus and necessitate undesirable down time for replacement or repair of component parts thereof. Still further, where the initial flat blank is a sheet delivered to the cupping press from a stack, it is possible to have two sheets delivered simultaneously toward the cupping press. This is obviously undesirable in that the press parts are designed and set to handle a particular material thickness which, if doubled, can seriously damage the press parts.

From the foregoing, it will be appreciated that the detection of flaws in the initial flat material blank is of considerable importance. It will be further appreciated that the high speed operation of the production equipment for seamless can bodies, and the accuracy required with regard to the cooperating dies and the like to achieve such high speed operation, make it desirable to optimize the detection of any flaw in the initial sheet material which might ultimately cause a break down or jamming of the can body producing equipment and/or the production of unacceptable can bodies. This is achieved in accordance with the present invention by passing the sheet material between fixed and displaceable roll members such that a defect which increases the surface height of the sheet material deflects the displaceable roll to actuate a detecting device which thus indicates the flaw and/or causes displacement of the defective sheet from the feed line.

Roll type sheet material gauging and flaw detecting arrangements have been provided heretofore, but none of the prior arrangements has provided the ability to achieve the accuracy of detection achieved in accordance with the present invention. In this respect, for example, detection in certain prior art arrangements is predicated upon differential displacement of two rolls between which the material passes and an electrical signal produced as a result of such differential displacement. With such arrangements, roll displacement can have a cancelling effect which allows a flaw to escape detection. Other opposed roll type detecting apparatus include an upper roll spanning the full width of the material being inspected and a roll deflection detector component at only one end of the upper roll. Due to the length of the roll and/or roll deflection as a result of the weight of the roll, a defect at or toward the end of the upper roll opposite the end having the detector component can escape detection.

SUMMARY OF THE INVENTION

The flaw detector apparatus in accordance with the present invention overcomes the foregoing and other disadvantages of previous devices. In this respect, the arrangement according to the present invention includes fixed and displaceable rolls and provides for the displaceable roll to be pivotally supported for displacement toward and away from the fixed roll and to include adjustable stop members adjacent the opposite ends of the roll to enable accurate adjustment of the preliminary spacing between the two rolls. The initial spacing is with respect to the thickness of the sheet material to be inspected and advantageously provides for optimizing the accuracy of the spacing of the displaceable roll relative to the fixed roll along the length of the displaceable roll. Additionally, a roll displacement detector arrangement is provided at each end of the displaceable roll to optimize detection of a flaw which might otherwise escape detection as a result of the length of the displaceable roll or roll deflection between the ends thereof. Preferably, the detector arrangement at each end of the displaceable roll includes an adjustable actuator cooperative with a pivotal switch operating lever, whereby actual displacement of the displaceable roll is multiplied to increase the sensitivity of the detector arrangement. Still further, in the preferred arrangement the displaceable roll is mounted on a bracket pivotal about an axis laterally spaced from the roll axis in the direction opposite that of the adjustable stop members and detector arrangements, thus to additionally multiply the actual displacement of the roll at its point of contact with the sheet of material being inspected.

In accordance with another aspect of the invention, the detector apparatus includes a pair of fixed rolls and three displaceable rolls associated therewith in axially staggered and overlapping relationship to cover the entire width of a sheet of material passing therebetween. Each of the displaceable rolls is individually pivotally supported as described above and provided with corresponding adjustable stop members and corresponding deflection detector arrangements as described. This arrangement advantageously enables adjusting each of the three displaceable rolls relative to the corresponding fixed roll to obtain accurate spacing therebetween with respect to the thickness of the sheet material being inspected. This minimizes spacing problems encountered with a single displaceable roll due to roll deflection resulting from the length thereof, and the individuality of the supports, adjusting and detecting arrangements for each of the displaceable rolls optimizes efficiency of the unit with respect to detecting flaws at any location along the width of the sheet material being inspected.

The provision of adjustment capability and roll deflection detectors at the opposite ends of the displaceable roll also enables detection of deflection at one end of the roll which might not be sufficient to cause deflection of the entire roll along its length about the pivot axis for the roll supporting bracket. In this respect, for example, a deflection encountered centrally of the displaceable roll with respect to its opposite ends would ideally be expected to uniformly displace the roll away from the fixed roll and about the bracket pivot axis. Likewise, a large enough flaw at either end of the displaceable roll would ideally be expected to so displace the displaceable roll. Under such ideal conditions, a single detector at either end or centrally of the displaceable roll would be sufficient. However, manufacturing tolerances with respect to the detector components as well as wear of the moving parts thereof can, at least eventually, create a condition where a flaw will result in deflection at one end of a roll relative to its support structure and relative to the opposite end of the roll. Such a deflection might not be detected if the detector arrangement were at the opposite end of the roll or in the center thereof. Accordingly, considerably improved accuracy is achieved by detector arrangements at the opposite ends of the displaceable roll, and the adjustable stop arrangement at each end together with the adjustable actuator arrangement advantageously enables maintaining the desired accuracy by adjustments to compensate for manufacturing tolerances and wear.

It is accordingly an outstanding object of the present invention to provide an improved apparatus for detecting increases in surface height of moving sheet material.

Another object is the provision of apparatus of the foregoing character having improved sensitivity with respect to the detection of flaws which increase surface height of the material being inspected.

Still another object is the provision of apparatus of the foregoing character including fixed and displaceable rolls and in which the displaceable roll is more accurately adjustable relative to the fixed roll than heretofore provided.

A further object is the provision of apparatus of the foregoing character having improved sensitivity for detecting deflection of the displaceable roll relative to the fixed roll.

Still a further object is the provision of apparatus of the foregoing character in which the displaceable roll is pivotally supported relative to the fixed roll and is provided at its opposite ends with arrangements for adjusting the spacing thereof relative to the fixed roll and for detecting deflection thereof relative to the fixed roll.

Yet another object is the provision of apparatus of the foregoing character including a plurality of displaceable rolls associated with fixed rolls in axially staggered and overlapping relationship therewith and in which the displaceable rolls are individually pivotal relative to the corresponding fixed roll, individually adjustable at the opposite ends thereof relative to the corresponding fixed roll, and provided adjacent the opposite ends thereof with corresponding deflection detector arrangements operable independent of one another and independent of the other displaceable rolls.

BRIEF DESCRIPTION OF THE DRAWING

The invention will be described with reference to the accompanying drawing, in which.

DESCRIPTION OF A PREFERRED EMBODIMENT

Figure 1:
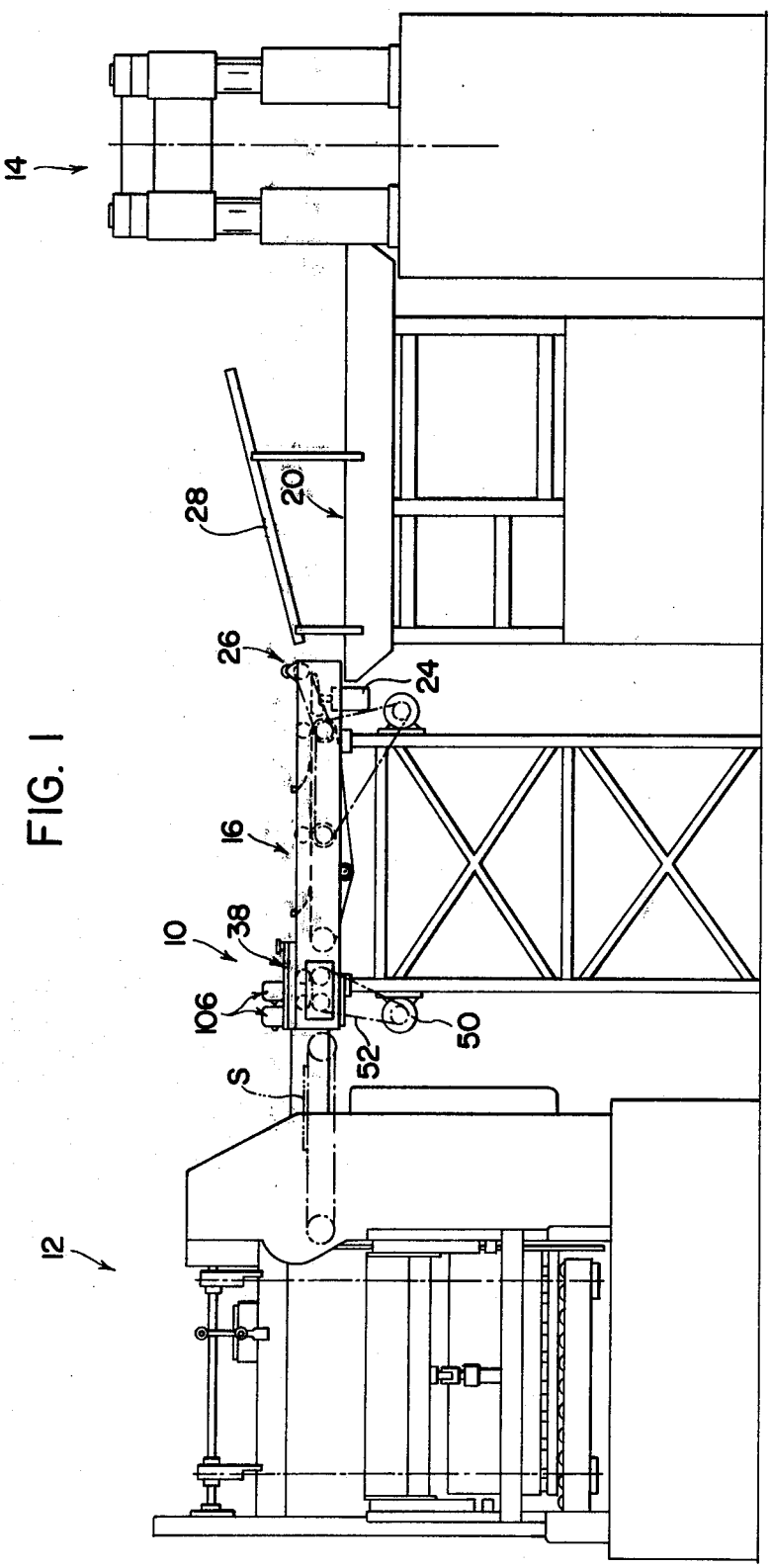
FIG. 1 is a side elevation view of flat detecting apparatus in accordance with the present invention located between a sheet material source and a cupping press.
Figure 2:
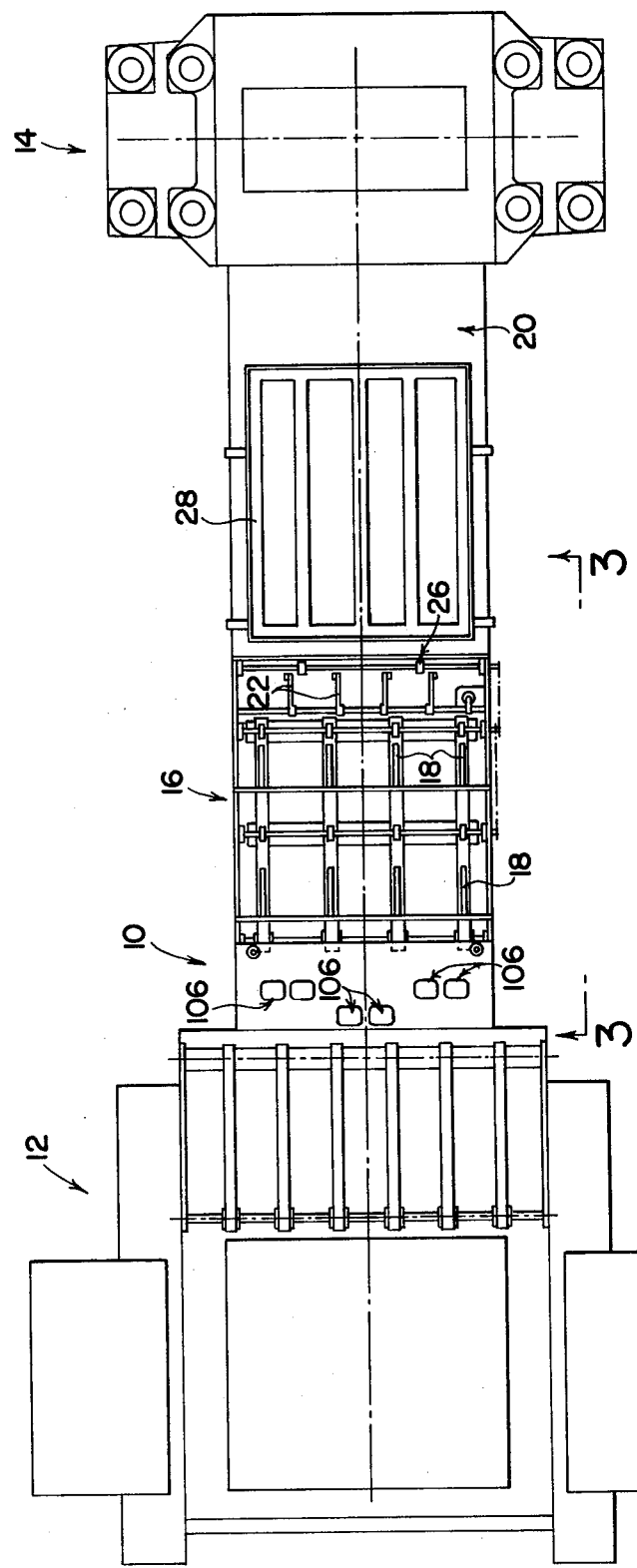
FIG. 2 is a plan view of the apparatus shown in FIG. 1.
Figure 3:
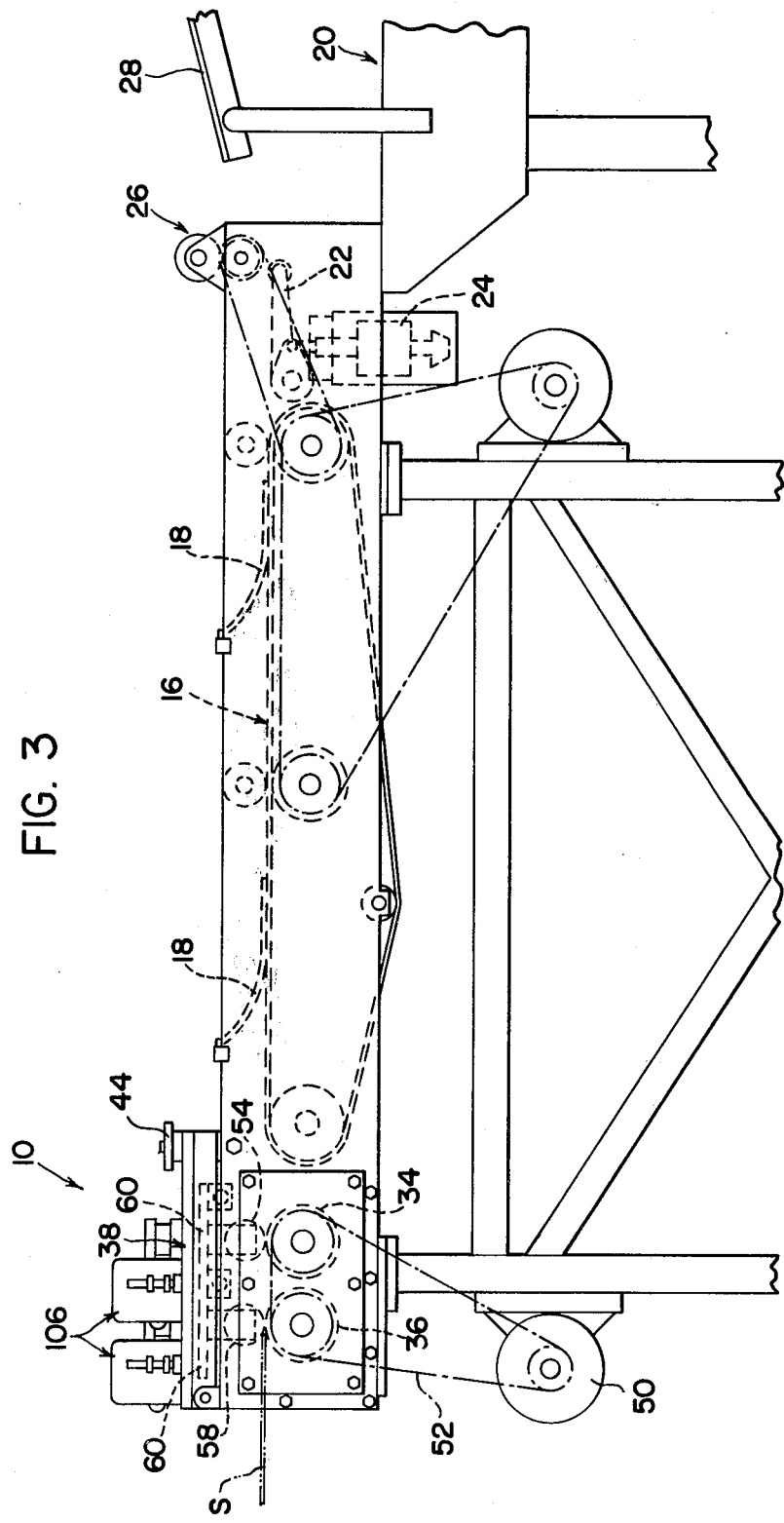
FIG. 3 is a detail side elevation view of the flaw detecting apparatus taken along line 3—3 in FIG. 2.
Figure 4:
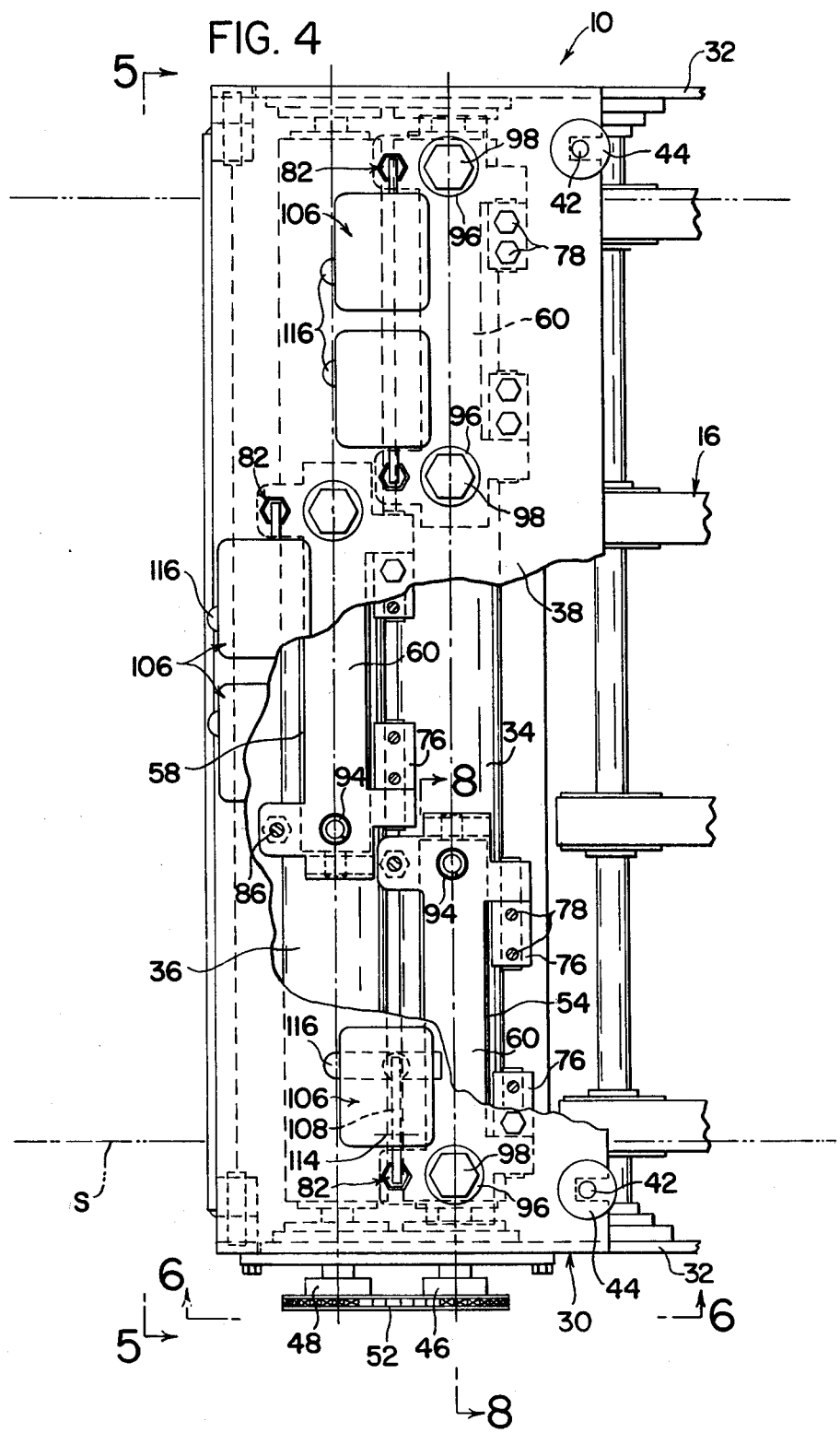
FIG. 4 is a detail plan view, partially in section, of the flaw detecting apparatus.
Figure 5:
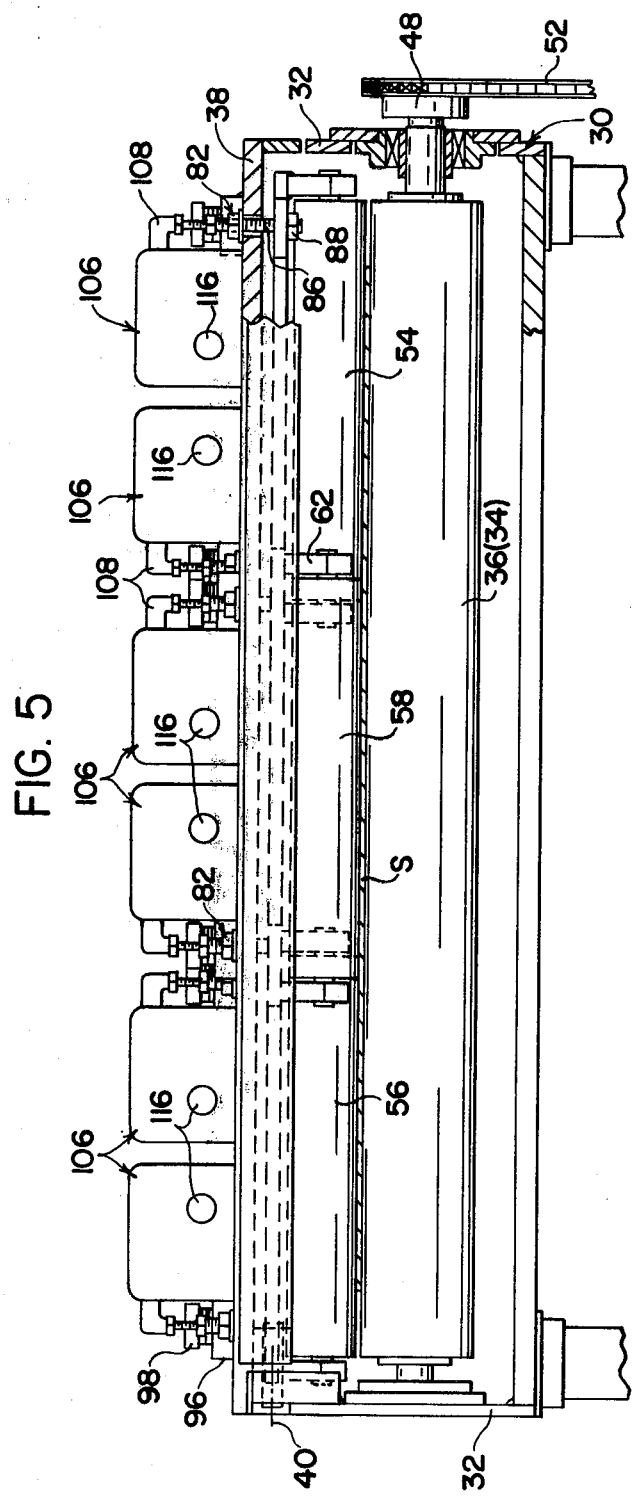
FIG. 5 is a front elevation view of the roll arrangement as seen along line 5—5 of FIG. 4.
Figure 6:
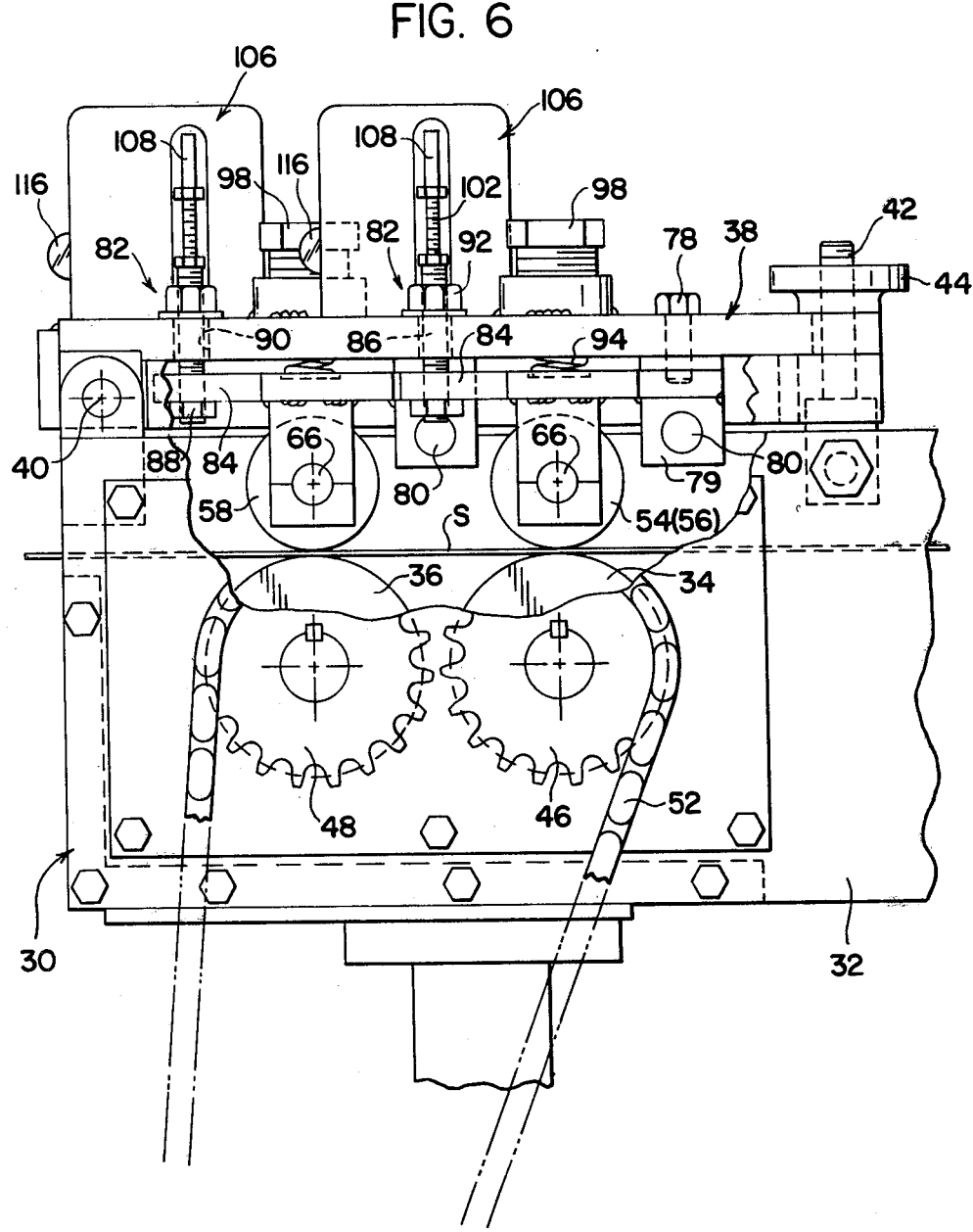
FIG. 6 is a side elevation view of the roll arrangement as seen along line 6—6 in FIG. 4.

Referring now in greater detail to the drawings wherein the showings are for the purpose of illustrating a preferred embodiment of the invention only and not for the purpose of limiting the invention, flaw detector apparatus 10 is shown in FIGS. 1 and 2 of the drawing in association with a source of sheet material 12 and a cupping press 14. In the embodiment shown, source 12 provides a stack of metal sheets and a feeding arrangement for delivering the sheets one by one to flaw detector 10 in the direction toward cupping press 14. Source 12 and cupping press 14 do not form a part of the present invention and are shown merely to illustrate the structural association of the flaw detecting apparatus of the present invention in connection with one possible use thereof. In connection with such use, it will be appreciated that a sheet of material S is delivered to flaw detector 10 from source 12 and between lower and upper rolls of the flaw detector, as explained more fully hereinafter, and thence onto a conveyor portion 16 leading toward cupping press 14. The sheet material is held against the conveyor by hold down fingers 18 and, if no flaws are detected, the sheet is delivered onto a sheet feeder portion 20 leading to the press. A plurality of sheet deflecting fingers 22 are disposed at the discharge end of conveyor 16 and are adapted to be actuated by a solenoid motor 24 from the horizontal position shown in FIG. 1 to an elevated position in which a sheet of material on conveyor 16 is directed upwardly between a pair of reject rolls designated generally by the numeral 26. Such actuation of the fingers 22 by solenoid motor 24 is in response to the detection of a flaw by detector 10 and results in the defective sheet being directed onto a reject tray 28 so that the sheet is not delivered to the press.

The structure and operation of flaw detector 10 will be best understood with reference to FIGS. 3–9 of the drawing. In this respect, the detector 10 includes a frame assembly comprising a first or lower frame portion 30 of box-like construction including spaced apart sidewalls 32 rotatably supporting a pair of horizontal parallel lower rolls 34 and 36. The frame assembly further includes a second or upper frame portion 38 in the form of a plate covering lower frame portion 30 and mounted thereon for hinged pivotal movement about an axis 40 parallel to the axes of rolls 34 and 36, for the purpose set forth hereinafter. In the embodiment shown, the hinge arrangement is provided adjacent the input end of the detector, and the opposite end of the frame assembly is provided with a pair of pivotal latch bolts 42 and corresponding latch nuts 44 to releaseably hold frame plate 38 in its closed position with respect to frame portion 30. Lower rolls 34 and 36 are adapted to be driven together to achieve the feeding of a sheet through the detector apparatus and, for this purpose, are provided at one end thereof with corresponding sprocket wheels 46 and 48 driven by a suitable motor 50 through a sprocket chain or the like 52.

In the preferred embodiment shown, a pair of upper rolls 54 and 56 are supported in overlying relationship with respect to lower roll 34 and an upper roll 58 is supported in overlying relationship with respect to lower roll 36. Upper rolls 54 and 56 are vertically aligned with lower roll 34 and are axially spaced apart from one another with respect to lower roll 34 so that each has an outer end adjacent the corresponding outer end of the lower roll. Upper roll 58 is vertically aligned with lower roll 36 and is axially positioned centrally thereof so as to span the axial space between rolls 54 and 56. Thus, the three upper rolls collectively cover the width of the lower rolls and thus the width of a sheet passing through the detector. In accordance with the present invention, each of the upper rolls 54, 56 and 58 is individually supported relative to the corresponding lower roll, is individually adjustable relative to the corresponding lower roll, and is individually displaceable relative to the corresponding lower roll in connection with the detection of a flaw in a sheet of material passing through the detector assembly. The structural arrangements for the three upper rolls by which these characteristics are achieved are identical. Accordingly, it will be appreciated that the following description of the support arrangement for upper roll 54 is applicable to the support arrangements for upper rolls 56 and 58.

Figure 7:
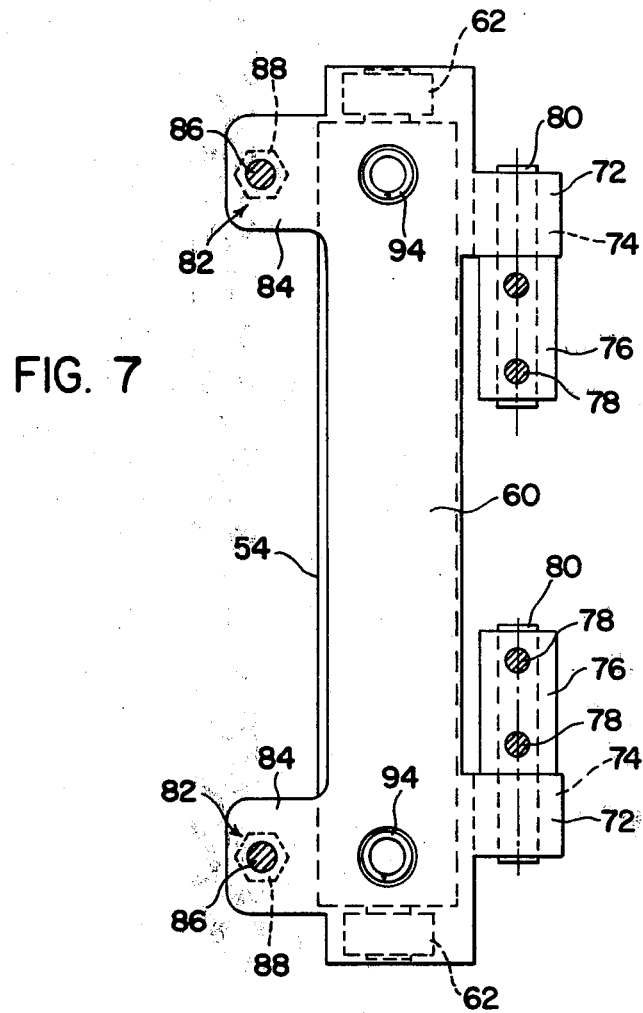
FIG. 7 is a plan view of the supporting arrangement for one of the upper rolls.
Figure 8:
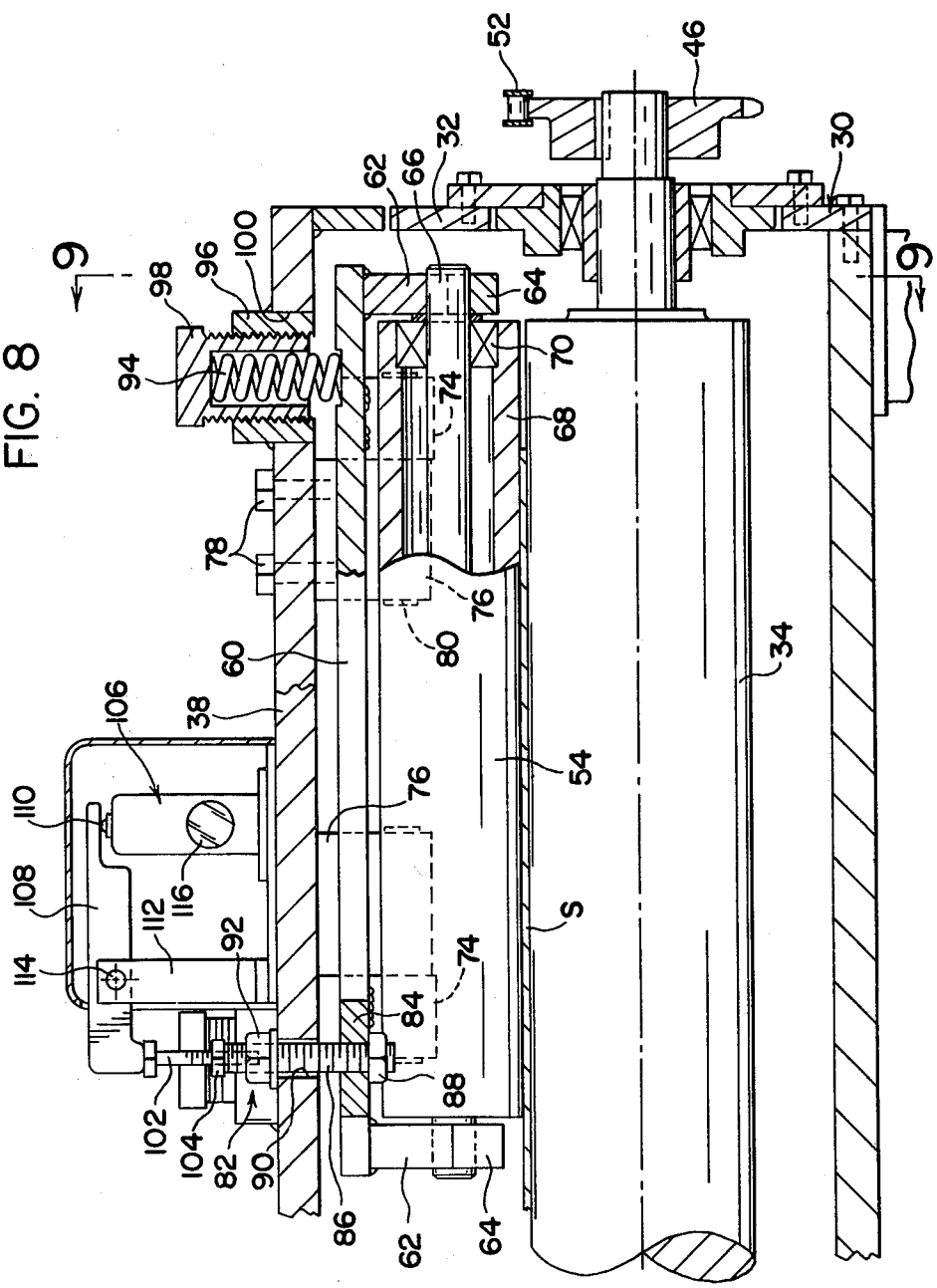
FIG. 8 is a sectional elevation view of the supporting arrangement taken along line 8—8 in FIG. 4; and, FIG. 9 is a sectional elevation view of the supporting arrangement as seen along line 9—9 in FIG. 8.
Figure 9:
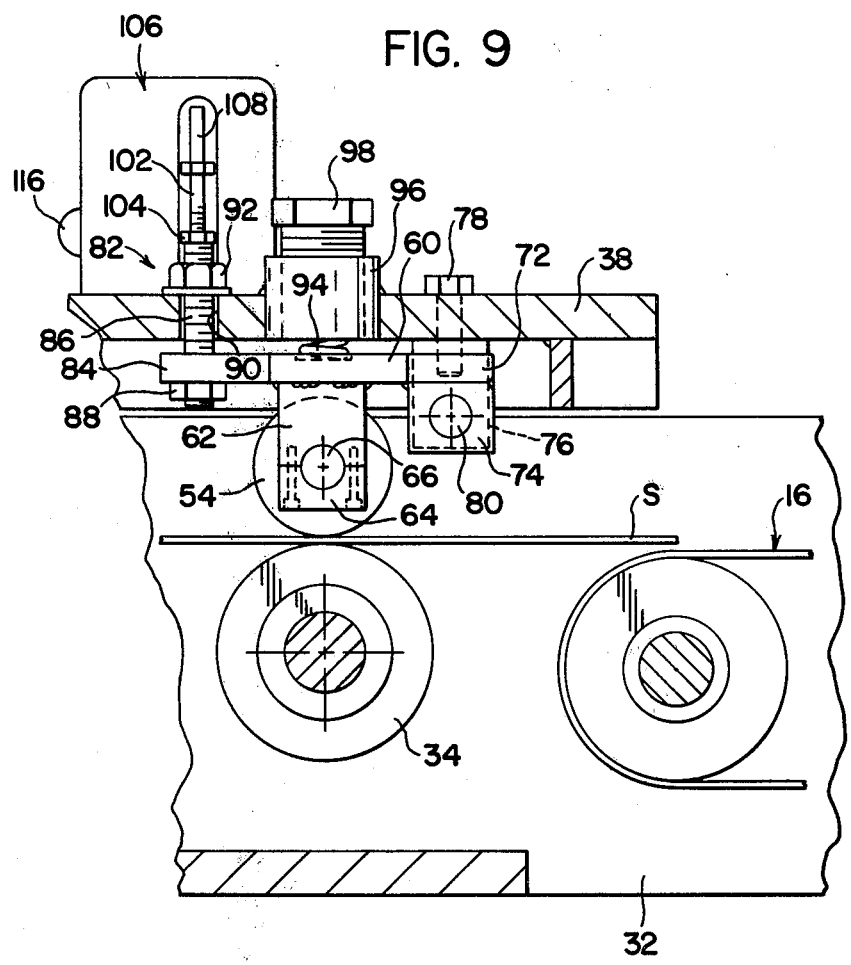

With reference in particular to FIGS. 7-9 of the drawing, upper roll 54 is supported relative to lower roll 34 by means of a bracket member 60 extending between the opposite ends of roll 54. Bracket member 60 is provided at its opposite ends with depending roll mounting blocks 62 welded or otherwise secured to the bracket, and a corresponding shaft clamping block 64 is bolted or otherwise secured to each mounting block 62. Preferably, upper roll 54 includes a shaft 66 tightly clamped at its opposite ends between mounting blocks 62 and clamping blocks 64 against rotation relative thereto, and a hollow roller body 68 supported at its opposite ends for rotation relative to shaft 66 by bearing assemblies 70.

Bracket 60 is mounted on upper frame plate 38 for pivotal movement toward and away from lower roll 34 about an axis parallel to and laterally spaced from the axis of upper roll 54. More particularly, bracket 60 is provided adjacent its axially opposite ends with laterally extending hinge fingers 72 to which depending hinge blocks 74 are suitably secured such as by welding. Further, frame plate 38 is provided with a pair of pivot blocks 76 secured thereto such as by bolts 78, and blocks 74 and 76 are provided with aligned openings receiving corresponding hinge pins 80 which provide a pivot axis for the bracket parallel to and laterally spaced from the axis of upper roll 54.

Upper roll 54 is adapted to be positioned in spaced relationship with respect to lower roll 34 in accordance with the thickness of the sheet material passing therebetween. In accordance with the present invention, such positioning is achieved by adjustable stop arrangements 82 at the axially opposite ends of upper roll 54 and laterally spaced from the roll axis in the direction opposite that of the hinge axis of the bracket as defined by pins 80. In the embodiment shown, the axially opposite ends of bracket 60 are provided with fingers 84 extending laterally of the bracket in the direction opposite that of hinge fingers 72, and each of the fingers 84 supports a corresponding one of the stop arrangements 82. Each stop arrangement includes a rod 86 having a lower end threadedly interengaged with finger 84 for displacement with bracket 60 and locked against rotative displacement relative to the bracket by means of a jam nut 88. Rod 86 extends vertically upwardly from bracket 60 through an opening 90 in frame plate 38, and the upper end of rod 86 is threaded to receive an adjustable stop nut 92. Accordingly, it will be appreciated that stop nuts 92 at the axially opposite ends of bracket 60 can be rotated in opposite directions relative to the corresponding rod 86 to adjust the position of the opposite ends of bracket 60 and thus the opposite ends of roll 54 relative to lower roll 34. This advantageously enables an accurate adjustment of the space between rolls 54 and 34 along the length of roll 54. It will be further appreciated that openings 90 through frame plate 38 permit displacement of bracket 60 upwardly relative to frame plate 38 in response to a flaw increasing the surface height of a sheet of material passing between the rolls.

Bracket 60, and thus roll 54, is biased toward lower roll 34 by means of a pair of coil springs 94 disposed between frame plate 38 and bracket 60. More particularly, frame plate 38 is provided adjacent the axially opposite ends of bracket 60 with spring retainer assemblies each including a sleeve 96 welded or otherwise secured to frame plate 38 and internally threaded to receive a spring adjusting nut 98. Frame plate 38 is provided with apertures 100 therethrough for sleeves 96, and the upper surface of bracket 60 is suitably recessed to receive and locate the lower ends of springs 94. Nuts 98 are adapted to be rotated relative to sleeves 96 to vary the spring force acting against bracket 60. Preferably, each of the springs 94 is vertically aligned with the axes of rolls 54 and 34 and is aligned laterally of the roll axes with the stop rod 86 at the corresponding end of bracket 60. Accordingly, the spring pressure is applied at the opposite ends of roll 54 and directly over the rolls to optimize accuracy of upper roll adjustment and accuracy in detecting flaws, as set forth more fully hereinafter.

Further in accordance with the present invention, a roll deflection detecting arrangement is provided for each of the axially opposite ends of upper roll 54. In the embodiment shown, each such detecting arrangement includes an actuator rod 102 at each of the axially opposite ends of bracket 60 and displaceable therewith in response to pivotal movement of the bracket about its pivot axis. In the preferred embodiment, each actuator rod 102 is in the form of a headed bolt coaxial with stop rod 86 at the corresponding end of the bracket and having a shank of smaller diameter than that of the stop rod. The upper end of each stop rod 86 is internally threaded for interengagement with the threaded lower end of the actuator rod, and the latter is provided with a lock nut 104 by which the actuator rod can be locked in an adjusted position relative to the stop rod. Each of the roll deflection detecting arrangements further includes a microswitch 106 mounted on frame plate 38 between the axially opposite ends of upper roll 54, and a corresponding switch operating lever 108. Each lever 108 has its opposite ends engaging the upper end of the corresponding actuator rod 102 and a switch button 110 of the corresponding microswitch. Each lever 108 is mounted on frame plate 38 by means of a suitable bracket 112 for pivotal displacement about an axis 114 transverse to the axis of roll 54.

It will be appreciated from the foregoing description that each of the axially opposite ends of upper roll 54 can be independently adjusted relative to lower roll 34 by means of the corresponding adjustable stop rod 86 and stop nut 92 and in accordance with the thickness of the sheet material to be inspected. It will be further appreciated that the position of each actuator rod 102 can be adjusted relative to the corresponding stop rod 86 to control the extent of roll and bracket displacement required to cause actuation of the corresponding microswitch 106. In connection with operation of the device during movement of sheet material between upper roll 54 and lower roll 34, a sheet of material of uniform thickness having no flaws therein of the type which elevate the surface height of the sheet will pass between rolls 34 and 54 without displacing or deflecting roll 54 and thus bracket 60 relative to lower roll 34. Should a sheet of material include a flaw of the type which increases the surface height thereof, the flaw will cause upper roll 54 and thus bracket 60 to be deflected upwardly from roll 34 against the bias of the springs 94 and about the pivot axis of the bracket. This upward deflection causes upward movement of one or both stop rods 86 and the corresponding actuator rod 102, thus pivoting one or both switch levers 108 about lever axis 114 to operate one or both switches 106. It will be appreciated that the positioning of stop rods 86 and the corresponding actuator rods 102 on the opposite side of the axis of roll 54 from the pivot axis of the bracket multiplies the vertical displacement of roll 54, and that the pivotal displacement of switch levers 108 multiplies the vertical displacement of actuator rods 102. Thus, through adjustments of stop rods 86 and actuator rods 102, switches 106 can be actuated in response to very minute increases in the surface height of the material being inspected. Furthermore, the adjustment capability of each of the opposite ends of the upper roll enable compensation for errors in manufacturing tolerances as well as wear of the component parts to enable maintaining the capability to detect such minute flaws.

It will be appreciated that the provision of three upper rolls oriented relative to lower rolls 34 and 36 as described hereinabove and each of which upper rolls is independently structurally associated with frame plate 38 in the manner described herein with regard to upper roll 54 provides for optimizing the detection of a flaw or flaws over the entire width of the sheet material being inspected and minimizes the likelihood of a flaw passing through the apparatus undetected. Furthermore, it will be appreciated that switches 106 can perform a number of functions in connection with the detecting apparatus and detecting procedure. In this respect, for example, with reference again to FIGS. 1, 2 and 3 it will be appreciated that each of the switches 106 can be connected in an electrical circuit to control the operation of solenoid motor 24 such that detecting fingers 22 are elevated when any flaw is detected so that the corresponding sheet is displaced onto reject tray 28. Additionally, each of the switches can be provided with an indicator light 116 which, for example, is normally on and which goes off when a flaw is detected. Such a light facilitates adjusting the corresponding actuator rod 102 so that the switch is actuated in response to a predetermined vertical displacement of the actuating rod, and this advantageously enables very fine adjustment to be made in this respect. Additionally, when the light goes off during operation of the apparatus a workman in attendance at the apparatus can visually determine that the apparatus functions properly to displace a defective sheet onto the reject tray. Further, should the light go out and remain out, the workman is aware that the apparatus is in need of adjustment for proper functioning, or that a bulb is burned out and needs to be replaced to facilitate such visual surveillance.

As mentioned hereinabove, biasing springs 94 are preferably vertically aligned with the axis of the corresponding upper roll and are positioned adjacent the axially opposite ends of the upper roll. Such positioning of the biasing springs is preferred in that it avoids roll or bracket deflection which could occur if the springs were otherwise positioned between the bracket and frame plate 38 and which deflection would cause a flaw to pass through the apparatus undetected. In this respect, if the springs were for example located in alignment with stop rods 86, bracket 60 could flex in the area above the corresponding roll in response to a flaw passing between the upper and lower rolls, whereby bracket 60 would not be pivoted about its end axis or would not be pivoted sufficiently to displace actuator rods 102 to the extent necessary to actuate the corresponding switch 106. With the biasing springs disposed directly over the axis of the upper roll, such flexure of the bracket is advantageously avoided thus increasing the sensitivity of the apparatus. Furthermore, the location of springs 94 at the opposite ends of the upper roll from the lower roll along the length of the upper roll, and achieving and maintaining such accuracy to avoid potential errors resulting from manufacturing tolerances and/or wear of parts. In this respect, each spring provides a considerable biasing force against the bracket, preferbly a force of up to six hundred pounds. The magnitude of such force biases the bracket relative to frame plate 38 at each of the hinge connections between the bracket and frame plate. This tightly interengages the hinge components to eliminate free play therebetween resulting from manufacturing tolerances and wear. Such spring force also biases the bracket ends and thus the roll ends relative to the hinge connections enabling the opposite ends of the roll to be accurately adjusted for the roll to be uniformly and accurately spaced from the lower roll.

The provision of the hinged connection between frame plate 38 and lower frame portion 30, and releasable clamping nuts 42 at the opposite end of the frame assembly as discussed herein, advantageously enables upper rolls 54, 56 and 58 and the corresponding brackets, biasing springs, stop arrangements and roll deflection detector assemblies to be pivoted upwardly as a unit about hinge axis 40 and away from lower rolls 34 and 36 to facilitate maintenance and replacement operations.

While considerable emphasis has been placed herein on the particular structure of the component parts of the detector apparatus and the structural interrelationships between the component parts, it will be appreciated that many embodiments of the invention can be made and many changes can be made in the preferred embodiment without departing from the principles of the present invention. Accordingly, it is to be distinctly understood that the foregoing descriptive matter is to be interpreted merely as illustrative of the present invention and not as a limitation.

Having thus described the invention, it is claimed:

1. A device for detecting increases in surface height of a moving sheet of material comprising, frame means, a first roll supported for rotation by said frame means, bracket means pivotally mounted on said frame means, a second roll mounted on said bracket means for pivotal movement therewith and for rotation relative thereto, said second roll being parallel to said first roll and supported by said bracket means for movement toward and away from said first roll, biasing means between said bracket means and frame means biasing said second roll toward said first roll, said second roll having axially opposite ends, adjustable stop means between said bracket means and frame means adjacent each said opposite ends of said second roll for adjusting the position of said second roll to space said second roll from said first roll a distance corresponding to the thickness of said sheet material, and roll deflection detector means between said bracket means and frame means adjacent each said opposite ends of said second roll responsive to a predetermined displacement of said second roll away from said first roll.

2. The device according to claim 1, wherein each said deflecton detector means includes means adjustable to vary said predetermined displacement of said second roll.

3. The device according to claim 1, wherein said frame means includes means supporting said bracket means, second roll, stop means, biasing means and roll deflection detector means as a unit for pivotal movement from an operative to an inoperative position with respect to said first roll.

4. The device according to claim 1, wherein said second roll has an axis, said bracket means being pivotal on said frame means about a pivot axis parallel to and laterally spaced in one direction from said axis of said second roll, said adjustable stop means being laterally spaced from said axis of said second roll in the direction opposite said one direction, said roll deflection detector means including actuator means mounted on said bracket means and spaced from said axis of said second roll in said opposite direction.

5. The device according to claim 4, wherein said biasing means includes spring means adjacent said opposite ends of said second roll and laterally between said pivot axis and said adjustable stop means.

6. The device according to claim 4, wherein said stop means includes first rod means mounted on said bracket means for displacement therewith relative to said frame means, and said actuator means includes second rod means mounted on said first rod means for displacement therewith, said second rod means being axially adjustably interengaged with said first rod means.

7. The detector according to claim 6, wherein said roll deflection detector means further includes switch means mounted on said frame means and having switch operating means, and lever means pivotally mounted on said frame means and having opposite ends respectively engaging said second rod means and said switch operating means.

8. The device according to claim 6, wherein said biasing means includes coil springs adjacent said opposite ends of said second roll, and means to adjust the biasing force of said coil springs.

9. The device according to claim 8, wherein said roll deflection detector means further includes switch means mounted on said frame means and actuated in response to displacement of said second rod means.

10. The device according to claim 9, wherein said frame means includes means supporting said bracket means, second roll, stop means, biasing means and roll deflection detector means as a unit for pivotal movement from an operative to an inoperative position with respect to said first roll.

11. A device for detecting increases in surface height of a moving sheet of material comprising, frame means, a first roll supported for rotation by said frame means about a first roll axis, a bracket member having axially opposite ends and longitudinally extending side edges with respect to said first roll, means at the axially opposite ends of one of said side edges of said bracket member interengaged with said frame means and supporting said bracket member for pivotal movement toward and away from said first roll about a pivot axis parallel to said first roll axis, adjustable stop means at the axially opposite ends of the other of said side edges of said bracket member interengaging with said frame means to limit movement of said bracket member toward said first roll, a second roll supported at said opposite ends of said bracket member for rotation about a second roll axis parallel to said first roll axis, said pivot axis and adjustable stop means being on opposite sides of a plane through said first and second roll axes, biasing means between said frame means and said bracket member at said opposite ends of said bracket member biasing said bracket member toward said first roll, adjustable actuator means at said opposite ends of said other side edge of said bracket member and displaceable with said bracket member, and switch means on said frame means for each said actuator means for actuation thereby in response to displacement of said bracket member toward said frame means.

12. The device according to claim 11, wherein said biasing means are coil springs having axes intersecting said first and second roll axes.

13. The device according to claim 12, and means for adjusting the biasing force of said springs.

14. The device according to claim 11, wherein said adjustable stop means includes first rod means having axes perpendicular to said first and second roll axes.

15. The device according to claim 14, wherein said first rod means are mounted on said bracket member for movement therewith, said adjustable actuator means including second rod means coaxial with said first rod means, and means interengaging said second rod means with said first rod means for displacement therewith and axial adjustment relative thereto.

16. The device according to claim 15, wherein said biasing means are coil springs having axes intersecting said first and second roll axes, and means for adjusting the biasing force of said springs.

17. The device according to claim 16, wherein said switch means includes pivotal operating lever means having an end engaged by the corresponding one of said second rod means.

18. The device according to claim 11, wherein said first roll is a lower roll and said second roll is an upper roll, and said frame means includes a fixed frame portion supporting said first roll and a movable frame portion hinged to said fixed frame portion and supporting said bracket member, second roll, stop means, biasing means, actuator means and switch means for pivotal displacement as a unit upwardly from said first roll.

19. A device for detecting increases in surface height of a moving sheet of material comprising, a pair of lower rolls spaced apart in the direction of movement of said sheet material, first frame means supporting said lower rolls for rotation about corresponding lower roll axes, second frame means hingedly mounted on said first frame means for pivotal movement about an axis parallel to said lower roll axes and between a first position overlying said lower rolls and a second position exposing said lower rolls, means releaseably holding said second frame means in said first position, three upper rolls, two of said upper rolls being axially aligned and axially spaced apart with respect to one another and vertically aligned with one of said lower rolls, the third of said upper rolls being vertically aligned with the other of said lower rolls and axially positioned to span the axial spacing between said two of said upper rolls, a bracket on said second frame means for each of said upper rolls, each said bracket rotatably supporting the opposite ends of the corresponding upper roll, each said bracket being hinged to said second frame means for pivotal movement about a bracket axis parallel to and laterally spaced from the corresponding upper roll axis, spring means between each bracket and said second frame means biasing each bracket and the corresponding upper roll toward the corresponding lower roll, each of said bracket carrying a pair of adjustable stop means one adjacent each of the opposite ends of the corresponding upper roll, said stop means interengaging with said second frame means to position the bracket and space the corresponding upper roll relative to the corresponding lower roll, said pair of stop means being laterally spaced from the corresponding upper roll axis in the direction opposite that of the corresponding bracket axis, each bracket further supporting a pair of adjustable actuator means one adjacent each of the opposite ends of the corresponding upper roll, said actuator means being displaceable with the corresponding bracket and laterally spaced from the corresponding upper roll axis in said opposite direction, and said second frame means carrying a pair of switch means for each bracket, each switch means of said pair of switch means being actuable by a different one of the pair of actuator means supported by the corresponding bracket.

20. The device according to claim 19, wherein said stop means are rods attached to the corresponding bracket and threaded to receive stop nuts engaging said second frame means to position the corresponding bracket and upper roll relative to the corresponding lower roll, and said actuator means are second rods coaxial with said first rods and threadedly interengaged therewith.

21. The device according to claim 20, wherein said spring means include a pair of coil springs for each bracket, one at each end of the corresponding upper roll, and the axes of which coil springs intersect the axes of the corresponding upper and lower rolls, and means to adjust the biasing force of each said coil spring.

22. The device according to claim 21, wherein each said switch means includes a pivotal operating lever engaged by the one of said second rods providing the corresponding actuator means.

* * * * *